United States Patent
Li et al.

(10) Patent No.: US 11,159,253 B1
(45) Date of Patent: Oct. 26, 2021

(54) METHOD FOR ADJUSTING AN ANTENNA PARAMETER, RADIO DEVICE, AND APPARATUS WITH A STORAGE FUNCTION

(71) Applicants: SHENZHEN JAGUAR WAVE TECHNOLOGY LTD., Shenzhen (CN); SHENZHEN TINNO WIRELESS TECHNOLOGY CO., LTD., Shenzhen (CN); SHENZHEN TINNO MOBILE TECHNOLOGY CO., LTD., Shenzhen (CN)

(72) Inventors: Haibo Li, Shenzhen (CN); Wei Shin Tung, Shenzhen (CN)

(73) Assignees: SHENZHEN JAGUAR WAVE TECHNOLOGY LTD., Shenzhen (CN); SHENZHEN TINNO WIRELESS TECHNOLOGY CO., LTD., Shenzhen (CN); SHENZHEN TINNO MOBILE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/986,226

(22) Filed: Aug. 5, 2020

(51) Int. Cl.
  *H04B 17/00* (2015.01)
  *H04B 17/21* (2015.01)
  (Continued)

(52) U.S. Cl.
  CPC .......... *H04B 17/21* (2015.01); *H04B 1/1027* (2013.01); *H04B 17/336* (2015.01)

(58) Field of Classification Search
  CPC ..... H04B 17/21; H04B 17/336; H04B 1/1027
  (Continued)

(56) References Cited

U.S. PATENT DOCUMENTS 9,515,378 B2 * 12/2016 Prasad .................. H01Q 1/245
10,085,120 B1 * 9/2018 Bromberg .............. H04B 17/12
(Continued)

FOREIGN PATENT DOCUMENTS

| CN | 103414488 A | 11/2013 |
| CN | 104467934 A | 3/2015 |
| CN | 107483737 A | 12/2017 |

OTHER PUBLICATIONS

Chinese Second office action, Chinese Application No. 201910290283.0, dated Jun. 28, 2021 (15 pages).
(Continued)

*Primary Examiner* — Don N Vo (57) ABSTRACT

The present disclosure relates to a wireless communication technology, and provides a method for adjusting an antenna parameter, a radio device, and an apparatus with a storage function. The method may include: acquiring a target environmental data set, wherein the target environmental data set includes environmental data of an antenna assembly in a current location; comparing the target environmental data set with an environmental data set corresponding to a preset scene; determining a first preset scene to which an antenna assembly corresponding to the target environment data set belongs, to obtain a preset antenna parameter corresponding to the first preset scene, and setting a parameter of the antenna assembly for a radio signal to the preset antenna parameter, wherein the first preset scene is a preset scene to which the current location of the antenna assembly belongs.

16 Claims, 3 Drawing Sheets

(51) Int. Cl.
*H04B 1/10* (2006.01)
*H04B 17/336* (2015.01)
(58) Field of Classification Search
USPC ........................................ 455/226.3
See application file for complete search history.

(56) References Cited

U.S. PATENT DOCUMENTS

| 2011/0122025 A1* | 5/2011 | Tu .......................... H01Q 3/00 |
| | | 342/367 |
| 2012/0064894 A1 | 3/2012 | Liu et al. |
| 2014/0128032 A1* | 5/2014 | Muthukumar .......... H04W 4/12 |
| | | 455/411 |

OTHER PUBLICATIONS

Chinese First office action, Chinese Application No. 201910290283.0, dated Mar. 25, 2021 (13 pages).

\* cited by examiner

METHOD FOR ADJUSTING AN ANTENNA PARAMETER, RADIO DEVICE, AND APPARATUS WITH A STORAGE FUNCTION

FIELD

The described embodiments relate to a wireless communication technology, and more particularly, to a method for adjusting an antenna parameter, a radio device, and an apparatus with a storage function.

BACKGROUND

Currently, an antenna parameter such as signal strength of a signal output by an antenna, is usually adjusted by adjusting a signal noise ratio (SNR, a ratio of an output signal to noise) of the signal output by the antenna. However, a process of the adjusting the SNR of the signal output by the antenna requires a lot of system resources. The SNR of the signal output by the antenna cannot be adjusted in real time according to an environmental condition where the antenna is located.

SUMMARY

The present disclosure provides a method for adjusting an antenna parameter, a radio device, and an apparatus with a storage function.

The present disclosure provides a method for adjusting an antenna parameter, including: acquiring a target environmental data set, wherein the target environmental data set includes environmental data of an antenna assembly in a current location; comparing the target environmental data set with an environmental data set corresponding to a preset scene; determining a first preset scene to which an antenna assembly corresponding to the target environment data set belongs, to obtain a preset antenna parameter corresponding to the first preset scene, and setting a parameter of the antenna assembly for a radio signal to the preset antenna parameter, wherein the first preset scene is a preset scene to which the current location of the antenna assembly belongs.

The present disclosure provides a radio device, including: a sensor group, a radio frequency device, an antenna assembly; and a processor; wherein the sensor group and the radio frequency device are respectively coupled to the processor, and the antenna assembly is coupled to the radio frequency device; wherein the processor is configured to control the sensor group to acquire a target environmental data set, wherein the target environmental data set comprises environmental data of the antenna assembly in a current location; the processor is configured to compare the target environmental data set with an environmental data set corresponding to a preset scene; the processor is configured to determine a first preset scene to which an antenna assembly corresponding to the target environment data set belongs; and the processor is configured to feed back information of the first preset scene to the radio frequency device; wherein the radio frequency device is configured to receive the information of the first preset scene; obtain preset antenna parameters corresponding to the first preset scene, and then set the parameter of the antenna assembly for radiating radio signals to the pre-set Set the antenna parameters; obtain a preset antenna parameter corresponding to the first preset scene, and set a parameter of the antenna assembly for a radio signal to the preset antenna parameter; wherein the first preset scene is a preset scene to which the current location of the antenna assembly belongs.

The present disclosure provides an apparatus with a storage function, including program data; wherein the program data is configured to execute operations including: acquiring a target environmental data set, wherein the target environmental data set comprises environmental data of an antenna assembly in a current location; comparing the target environmental data set with an environmental data set corresponding to a preset scene; determining a first preset scene to which an antenna assembly corresponding to the target environment data set belongs, to obtain a preset antenna parameter corresponding to the first preset scene, and setting a parameter of the antenna assembly for a radio signal to the preset antenna parameter, wherein the first preset scene is a preset scene to which the current location of the antenna assembly belongs.

DETAILED DESCRIPTION

The embodiments of the present disclosure will be described clearly and completely in conjunction with the drawings in the embodiments of the present disclosure.

Figure 1:
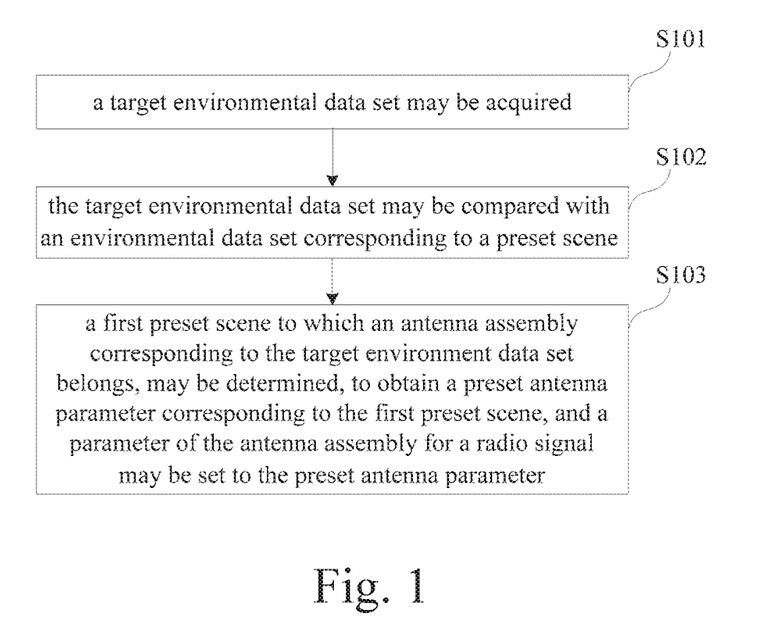
FIG. 1 is a flow chart of a method for adjusting an antenna parameter in accordance with an embodiment in the present disclosure.

Referring to FIG. 1, FIG. 1 is a flow chart of a method for adjusting an antenna parameter in accordance with an embodiment in the present disclosure.

Block S101, a target environmental data set may be acquired.

As understood by those skilled in the art, a propagation process of radio signals may be affected by an environmental factor. Generally, the worse the environmental condition, the greater the influence of the radio signals during the propagation process. It may be manifested by significant reduction in a propagation distance and signal strength.

In view of this, the method for adjusting the antenna parameters provided in this embodiment aims to ensure the ideal communication state of the radio signal in different circumstances as much as possible. Information acquired in real time may be required to describe an environmental condition at which an antenna assembly is located. Specifically, a target environmental data set may be acquired, and the target environmental data set may include environmental data of an antenna assembly in a current location. The environmental data may be configured to describe an environmental situation of the antenna assembly in the location.

It should be understood that the environmental condition of the antenna assembly in the location may usually include a plurality of properties, such as temperature, humidity, and oxygen content. Therefore, environmental information in various properties of the antenna assembly in the location may be converted into environmental data, to generate a plurality of environmental data configured to describe the environmental conditions of the antenna assembly in the location. The target environmental data set may be an integration of the generated environmental data, to comprehensively describe the environment of the antenna assembly in the location.

Block S102, the target environmental data set may be compared with an environmental data set corresponding to a preset scene.

In this embodiment, there may be at least a little difference between environmental data corresponding to different scenes. For example, environmental factors such as temperature, humidity, and space size may be different between indoor and outdoor environments. Therefore, a plurality of environmental factors may be defined different scenes by environmental data sets. Specifically, each environmental data may describe a specific scene, by defining various environmental data configured to describe environmental factors. The above-mentioned preset scene may be a specific scene in which corresponding environmental data is preset. The environment data set corresponding to the preset scene may be described as an environmental data set.

The environmental data set of the antenna assembly in the current location (i.e., the target environmental data set) may be compared with the environmental data set corresponding to the preset scene, to determine the preset scene that the target environmental data set of the antenna assembly matches (i.e., the preset scene to which the current location of the antenna assembly belongs). For example, whether the antenna assembly is indoors or outdoors.

Block S103, a first preset scene to which an antenna assembly corresponding to the target environment data set belongs, may be determined, to obtain a preset antenna parameter corresponding to the first preset scene, and a parameter of the antenna assembly for a radio signal may be set to the preset antenna parameter.

In this embodiment, the target environment data set may be compared with the environment data set corresponding to the preset scene, to determine the preset scene that the target environmental data set of the antenna assembly matches (i.e., the first preset scene to which the current location of the antenna assembly belongs). The first preset scene may be the preset scene to which the current location of the antenna assembly belongs. In order to ensure that the radio signal radiated by the antenna assembly achieves the ideal communication state in the first preset scene, the preset antenna parameter may be preset in the preset scene (the first preset scene is no exception). The preset antenna parameter may be a guarantee that the antenna assembly may achieve the ideal communication state in the first preset scene. Therefore, after the first preset scene to which the current location of the antenna assembly belongs, is determined, the preset antenna parameter corresponding to the first preset scene may be obtained. The parameter of the antenna assembly for the radio signal may be set to the preset antenna parameter, so that the radio signal radiated by the antenna assembly may achieve the ideal communication state in the first preset scene. That is, a sufficient propagation distance and signal strength may be ensured. In this embodiment, as the environment of the antenna assembly changes, the antenna parameter of the antenna assembly may be adjusted in real time, so that the ideal communication state in any scene may be achieved.

As the above-mentioned descriptions, the method for adjusting the antenna parameter provided by the present disclosure, may be to realize that, the antenna parameter according to the environmental condition of the antenna assembly in the location may be adjusted in real time. The environmental data set of the antenna assembly in the current location, i.e., a target environmental data set, may be obtained, thereby the environmental condition of the antenna assembly in the location, may be determined. Then, the first preset scene to which the antenna assembly corresponding to the target environment data set belongs, may be determined. The first preset scene to which the antenna assembly belongs may correspond to the preset antenna parameter. The parameter of the antenna assembly for the radio signal may be set to the preset antenna parameter, so that the radio signal radiated by the antenna assembly may achieve the ideal communication state in the first preset scene.

Figure 2:
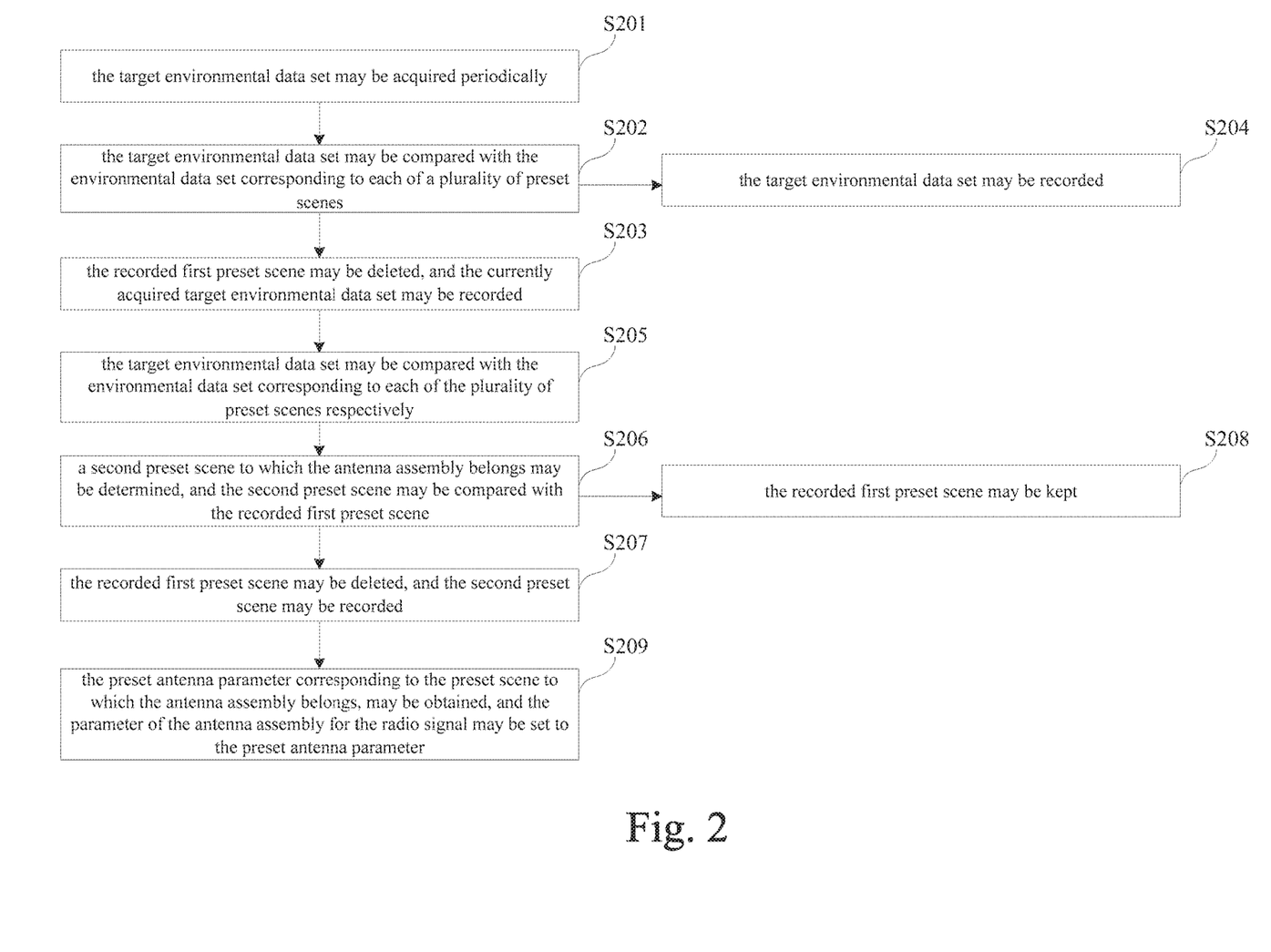
FIG. 2 is a flow chart of a method for adjusting an antenna parameter in accordance with an embodiment in the present disclosure.

Referring to FIG. 2, FIG. 2 is a flow chart of a method for adjusting an antenna parameter in accordance with an embodiment in the present disclosure. It should be noted that, the difference between this embodiment and the above-mentioned embodiment is that the antenna parameter of the antenna assembly may be adjusted only when the scene to which the antenna assembly belongs, changes, to reduce amount of logical operations, thereby calculation burden and system power consumption may be reduced. Descriptions are explained in detail below.

S201, the target environmental data set may be acquired periodically.

A method for adjusting an antenna parameter provided in this embodiment may ensure an ideal communication state of a radio signal in different circumstances. Information acquired in real time may be required to describe an environmental condition at which an antenna assembly is located. Specifically, a target environmental data set may be acquired, and the acquired target environmental data set may be recorded. The target environmental data set may include environmental data of an antenna assembly in a current location. The environmental data may be configured to describe an environmental situation of the antenna assembly in the location.

It should be noted that, in order to reduce the calculation burden and the system power consumption, in this embodiment, it may be to periodically acquire the target environmental data set instead of continuously acquiring the target environmental data set. In addition, a time period for acquiring the target environmental data set may be determined according to a real-time requirement of the environmental data where the antenna assembly is located. It may be understood that the shorter the time period for acquiring the target environmental data set, the more real-time the target environmental data set acquired may be guaranteed.

Block S202, the target environmental data set may be compared with the environmental data set corresponding to each of a plurality of preset scenes.

In this embodiment, in order to reduce the amount of logic operations, calculation burden, and system power consumption, the antenna parameter of the antenna assembly may be adjusted only when the scene to which the antenna assembly belongs, changes. The target environment data set acquired each time may be one of a basis configured to determine whether the scene to which the antenna assembly belongs, changes.

Specifically, since the current target environmental data set is acquired each time, the previously acquired target environmental data set may be recorded. The recorded target environmental data set may represent the environmental condition of the antenna assembly in the current location (i.e., the scene to which the antenna assembly belongs). By comparing the currently acquired target environmental data set with the recorded target environmental data set, it may determine whether the two are same. When the two are the same, it may mean that, the current location of the antenna assembly and its environmental condition do not have changed, and then block S204 may be performed. When the two are different, it may mean that, the current location of the antenna assembly and/or its environmental condition have changed, and further confirmation may be required, so that block S203 may be performed.

Block S203, the recorded first preset scene may be deleted, and the currently acquired target environmental data set may be recorded.

In this embodiment, when the currently acquired target environmental data set is different from the recorded target environmental data set, it may mean that, the current location of the antenna assembly and/or its environmental condition have changed, and further confirmation may be required. Therefore, the recorded target environmental data set previously acquired may be deleted, and the currently acquired target environmental data set may be recorded to be configured to compare with the environmental data set corresponding to the preset scene in a subsequent process. Then block S205 may be performed.

Block S204, the target environmental data set may be recorded.

In this embodiment, when the currently acquired target environmental data set is the same as the recorded target environmental data set, it may mean that, the current location of the antenna assembly and/or its environmental condition do not have changed. The previously recorded target environmental data set may be retained without adjusting the antenna parameter of the antenna assembly. Then the process may be ended.

Block S205, the target environmental data set may be compared with the environmental data set corresponding to each of the plurality of preset scenes respectively.

Since the method for adjusting the antenna parameter in this embodiment is based on the scene to which the antenna assembly is located, and since the antenna parameter of the antenna assembly is adjusted by radio signal transmission requirements corresponding to the scene, the antenna assembly may be ensured to achieve the ideal communication state in the scene.

In view of this, the plurality of preset scenes may be set in advance. The plurality of preset scenes may be scenes to which the antenna assembly may be applied. Each of the plurality of preset scenes may correspond to an environmental data set configured to describe its environmental information (i.e., environmental conditions). When a target environmental data set of an antenna assembly in a location matches an environmental data set corresponding to a preset scene, it may mean that, the antenna assembly is in a scene described by the preset scene.

It should be noted that, environmental factors that affect the propagation process of the radio signal radiated by the antenna assembly, may include temperature, humidity, space size, oxygen content, and rainfall. Since the target environmental data set is configured to describe the environment of the antenna assembly in the current location, it may include at least one of temperature data, humidity data, space size data, oxygen content data, and rainfall data of the antenna assembly in the current location. By a data set configured to characterize various environmental factors, the environmental condition of the antenna assembly in the location may be more fully described. In addition, the environmental data set corresponding to each of the plurality of preset scenes to describe its environmental information may correspond to a type of environmental data contained in the target environmental data set. For example, the target environmental data set may include temperature data, humidity data, and space size data of the antenna assembly in the current location. The environmental data set corresponding to each of the plurality of preset scenes may also include temperature data, humidity data, and space size data.

In the above-mentioned descriptions, after the currently acquired target environmental data set is compared with the recorded target environmental data set, and after the currently acquired target environmental data set is not the same as the recorded target environmental data set, is determined, it only shows that the antenna assembly in the current location and/or its environmental condition may change, and further confirmation may be required. Specifically, the target environmental data set may be compared with the environmental data set corresponding to each of the plurality of preset scenes to determine a preset scene, that the scene described by the target environmental data set of the antenna assembly in the current location matches, and the preset scene may be recorded. The first recorded preset scene to which the antenna assembly in the location belongs may be the first preset scene.

Block S206, a second preset scene to which the antenna assembly belongs may be determined, and the second preset scene may be compared with the recorded first preset scene.

In this embodiment, since the target environment data set is periodically acquired, the target environment data set information corresponding to the current antenna assembly may be continuously updated. Correspondingly, the preset scene to which the antenna assembly belongs may be continuously updated accordingly. During an update process of the preset scene to which the antenna assembly belongs, by comparing the target environmental data set with the environmental data set corresponding to each of the plurality of preset scenes respectively, after the preset scene to which the current location of the antenna belongs is determined, the preset scene to which the current location of the antenna assembly belongs may be described as a second preset scene. The second preset scene may be compared with the recorded first preset scene to determine whether the two are same, to further confirm whether the current location of the antenna assembly and/or its environmental condition have changed. When the two are the same, it may mean that, the current location of the antenna assembly and/or its environmental condition do not have changed, and block S208 may be performed. When the two are not same, it may mean that, the current location of the antenna assembly and/or its environmental condition have changed, and block S207 may be performed.

In this embodiment, the environment of the antenna assembly in the location may determine an antenna parameter setting of the antenna assembly. The change of the location of the antenna assembly may only cause the environment of the antenna assembly to change. It may not exclude that the location of the antenna assembly changes, to case that the environmental factors that affect operations of the antenna assembly changes. In this case, it may not need to adjust the antenna parameter of the antenna assembly.

Block S207, the recorded first preset scene may be deleted, and the second preset scene may be recorded.

In this embodiment, after the second preset scene is compared with the recorded first preset scene, it may determine that the second preset scene is not same as the recorded first preset scene, and then the antenna assembly may be explained that the current location and/or its environmental condition have changed. Therefore, the recorded first preset scene may be deleted, and the second preset scene may be recorded (the recorded second preset scene may become the previously recorded first preset scene, after the preset scene to which the antenna assembly belongs is updated), and may be configured to determine the antenna parameter required for the antenna assembly in a subsequent process. Then block S209 may be performed.

Block S208, the recorded first preset scene may be kept.

In this embodiment, after the second preset scene is compared with the recorded first preset scene, it may determine that the second preset scene is same as the recorded first preset scene. It may mean that, the current location and/or its environmental condition do not have changed. The first preset scene recorded previously is retained, so that it may not need to adjust the antenna parameter of the antenna assembly. Then the process may be end.

Block S209, the preset antenna parameter corresponding to the preset scene to which the antenna assembly belongs, may be obtained, and the parameter of the antenna assembly for the radio signal may be set to the preset antenna parameter.

In this embodiment, each of the plurality of the preset scenes may correspond to a preset antenna parameter. The preset antenna parameter may be configured to ensure that the radio signal radiated by the antenna assembly may achieve the ideal communication state in the scene. The antenna assembly in this embodiment may be an antenna array including a plurality of antennas. The antenna included in the antenna assembly may have different polarization directions. The antenna assembly may integrate different forms of radio signals to meet communication requirements, by antenna electrical signals of different phases and amplitudes.

In this embodiment, the parameter of the antenna assembly for the radio signal may include effective isotropic radiated power (EIRP), an antenna array integration form, and a beamforming algorithm. Parameter types of the antenna assembly for the radio signal may correspond to the parameter types included in the preset antenna parameter.

The EIRP may be also known as equivalent isotropic radiated power. A radio signal radiated by an antenna may be equivalent to a radio signal radiated by an omnidirectional antenna. Radio signal strength radiated by the omnidirectional antenna may be the equivalent signal strength of the radio signal radiated by the antenna, and may be configured to describe signal strength of a radio signal radiated by an antenna. It should be noted that, the EIRP may be configured to describe minimum signal strength necessary to achieve the ideal communication state in a preset scene.

The radio signal radiated by the antenna assembly in this embodiment may be obtained by integrating the signal radiated by the antenna included in the antenna assembly. An integrated form of the antenna array and its antenna array may determine signal strength and a direction of a radiated radio signal (i.e., electromagnetic radiation). When electrical signals of different phases is input to each of the plurality of antennas in the antenna assembly, it may cause the antenna assembly to radiate radio signals in different directions, or circularly polarized radio signals in different directions; or when electrical signals of different amplitudes (i.e., the electrical signals with different energy) is input to each of the plurality of antennas in the antenna assembly, the antenna assembly may integrate radio signals with different signal strength. Concentration of the radio signals radiated by each of the plurality of antennas in the antenna assembly may also affect signal strength of the radio signal radiated by the antenna assembly at the signal convergence.

An algorithm of the antenna assembly integrating electrical signals radiated by different antennas may be based on a beamforming algorithm. The antenna assembly may weight and synthesize the electrical signals of the plurality of antennas to form an ideal radio signal in a required direction. The antenna assembly may integrate the electrical signals of the plurality of antennas included in it based on the beamforming algorithm, to obtain the radio signal with the required direction and signal strength.

In this embodiment, after the preset scene to which the antenna assembly in the location belongs is determined, the preset antenna parameter corresponding to the preset scene to which the antenna assembly belongs may be obtained. The parameter of the antenna assembly for the radio signal may be set to the preset antenna parameter, to ensure that the radio signal radiated by the antenna assembly may reach the ideal communication state in the preset scene. The EIRP, the antenna array integration form, and the beamforming algorithm of the antenna assembly for the radio signal, may be set to parameters as the EIRP, the antenna array integration form, the beamforming algorithm, and other parameters included in the preset antenna parameters, so that the radio signal radiated by the antenna assembly may reach the ideal communication state in the preset scene.

It should be noted that, a traditional antenna array is preset with a large number of antenna integration combinations. The preset antenna integration combinations are configured to radiate radio signals one by one during application process, until all the preset antenna integration combinations are traversed or find a combination of antennas that meet requirements to radiate radio signals with different signal strengths and directions. In the method for adjusting the antenna parameter in this embodiment, the environment of the antenna assembly may be determined in advance, to ensure that the antenna assembly may reach minimum signal strength in the ideal communication state. Then the antenna array may be integrated to eliminate antenna integration combination that output signal strength is lower than a requirement in the integration result. The eliminated antenna integration combination may not be applied to radiate radio signals, thereby attempted integration of some antennas may be reduced. Therefore, the antenna parameter of the antenna assembly may be quickly adjusted to achieve the ideal communication state.

The beamforming algorithm applied by the antenna assembly may need to be calculated by propagation distance of the radio signal. The target environment data set obtained by the antenna assembly in the location in this embodiment may include distance data described space size of the antenna assembly. The distance data may be the maximum propagation distance of the radio signal, and may be applied to the beamforming algorithm. There may not need to measure the distance data in addition to the beamforming algorithm. It may be great significance for the study of environmental factors that interfere with the performance of the antenna.

The radio signal radiated by the antenna assembly in this embodiment may be in a form of millimeter waves. An electromagnetic wave in a frequency range of 30 to 300 GHz (wavelengths in a range of 1 to 10 mm) may be generally called a millimeter wave. The millimeter wave may be located in a wavelength range where microwaves and far infrared waves overlapped, such as an electromagnetic wave in a 60 GHz frequency range, and may have high signal transmission effectiveness. Since wavelength of the radio signal in the form of millimeter waves is shorter, the propagation process may be easily affected by an environmental factor. The method for adjusting the antenna parameter in this embodiment may adjust the antenna parameter in real time according to the environmental condition where the antenna assembly is located, to minimize impact of the environmental factor on a radio signal transmission effect.

The following describes an application example of the method for adjusting antenna parameter in this embodiment. It is merely an example, and does not limit the application environment and form of the method for adjusting antenna parameter in this embodiment.

TABLE 1

| Scene 1 | | | Scene 2 | | | Scene 3 | | |
|---|---|---|---|---|---|---|---|---|
| temperature (° C.) | humidity (% RH) | distance (m) | temperature (° C.) | humidity (% RH) | distance (m) | temperature (° C.) | humidity (% RH) | distance (m) |
| 23 ± 2 | 55 ± 3 | 1 ± 0.2 | 26 ± 2 | 60 ± 3 | 3 ± 0.2 | 30 ± 2 | 65 ± 3 | 5 ± 0.2 |
| Preset antenna parameters | | | Scene 1 | | | Scene 2 | | Scene 3 |
| EIRP | | | P1 ± ΔP1 | | | P2 ± ΔP2 | | P3 ± ΔAP3 |
| Antenna array integration | | | B1 | | | B2 | | B3 |
| Beamforming algorithm | | | A1 | | | A2 | | A3 |

Scene 1/Scene 2/Scene 3 may represent conference room/office/outdoor scene, respectively.
P1/P2/P3 may be the EIRP power set in Scene 1/Scene 2/Scene 3, respectively; AP1/AP2/AP3 may be the power error set in Scene 1/Scene 2/Scene 3, respectively; B1/B2/B3 may be the integrated form of antenna array in Scene 1/Scene 2/Scene 3, respectively; A1/A2/A3 may be the beamforming algorithm in Scene 1/Scene 2/Scene 3, respectively.

It should be noted that, the distance data disclosed in Table 1 may describe maximum distance that a radio signal needs to travel, thereby a space size of the preset scene may be defined.

The environment data set and the preset antenna parameter of a plurality of preset scenes preset in this embodiment may be summarized into a table form configured to be called. A number of preset scenes in this embodiment are not limited to the number disclosed in Table 1. The environmental data set and the preset antenna parameter of each of the plurality of the preset scenes in Table 1 are also not limited to situations disclosed in Table 1.

When the target environmental data set of the antenna assembly is obtained, the above-mentioned Table 1 may be called, to compare the target environmental data set with the environmental data set corresponding to each of the plurality of the preset scenes in Table 1. The preset scene that the target environmental data set of the antenna assembly matches may be determined, i.e., the preset scene to which the antenna assembly belongs may be determined. For example, the antenna assembly may be in an office, a conference room, and outdoors.

After the preset scene to which the antenna assembly belongs is determined, the preset antenna parameter (including EIRP, antenna array integration form, beamforming algorithm, and other parameters) corresponding to the preset scene from table 1 may be obtained. The parameter of the antenna assembly for the radio signal may be set to the preset antenna parameter.

In summary, the method for adjusting the antenna parameter provided by the present disclosure may be to realize adjusting the antenna parameter in real time according to the environmental condition of the antenna assembly in the location, to obtain the environmental data set of the current location of the antenna assembly (i.e., the target environmental data set), so as to determine the environmental condition of the location where the antenna assembly is located. Then, the preset scene to which the antenna assembly corresponding to the target environment data set belongs may be determined. The preset scene to which the antenna assembly belongs may correspond to the preset antenna parameter. The parameter of the antenna assembly for the radio signal may be set to the preset antenna parameter, so that the radio signal radiated by the antenna assembly may achieve the ideal communication state in the preset scene.

Figure 3:
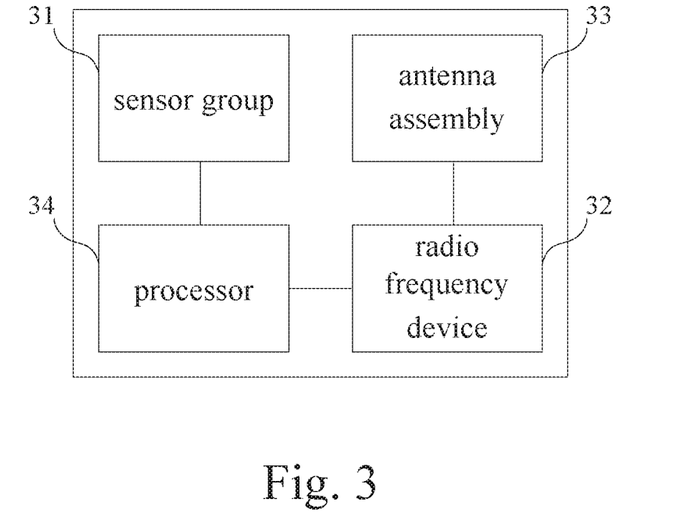
FIG. 3 is a structural illustration of a radio device in accordance with an embodiment in the present disclosure.

Referring to FIG. 3, FIG. 3 is a structural illustration of a radio device in accordance with an embodiment in the present disclosure.

In this embodiment, the radio device 3 may include a sensor group 31, a radio frequency device 32, an antenna assembly 33, and a processor 34. The sensor group 31 and the radio frequency device 32 may be respectively coupled to the processor 34. The antenna assembly 33 may be coupled to the radio frequency device 32.

The processor 34 may be configured to control the sensor group 31 to acquire a target environmental data set. The target environmental data set may include environmental data of the antenna assembly 33 in a current location. The target environmental data set may be compared with an environmental data set corresponding to a preset scene. A first preset scene to which the antenna assembly 33 corresponding to the target environment data set belongs may be determined. Information of the first preset scene may be feed back to the radio frequency device 32.

The radio frequency device 32 may be configured to receive the information of the first preset scene. A preset antenna parameter corresponding to the first preset scene may be obtained, and a parameter of the antenna assembly 33 for a radio signal may be set to the preset antenna parameter. The first preset scene may be a preset scene to which the current location of the antenna assembly 33 belongs.

The sensor group 31 may include at least one of sensors. The sensor group 31 may be configured to detect at least one of temperature data, humidity data, space size data, oxygen content data, and rainfall data, in the current location of the antenna assembly.

It should be noted that, the radio device 3 may serve as an output of a radio signal. The radio device 3 may be in a form of a device such as a router. In addition, the radio device 3 in this embodiment may implement the method for adjusting the antenna parameter in the above-mentioned embodiments, therefore no additional description is given herein.

Figure 4:
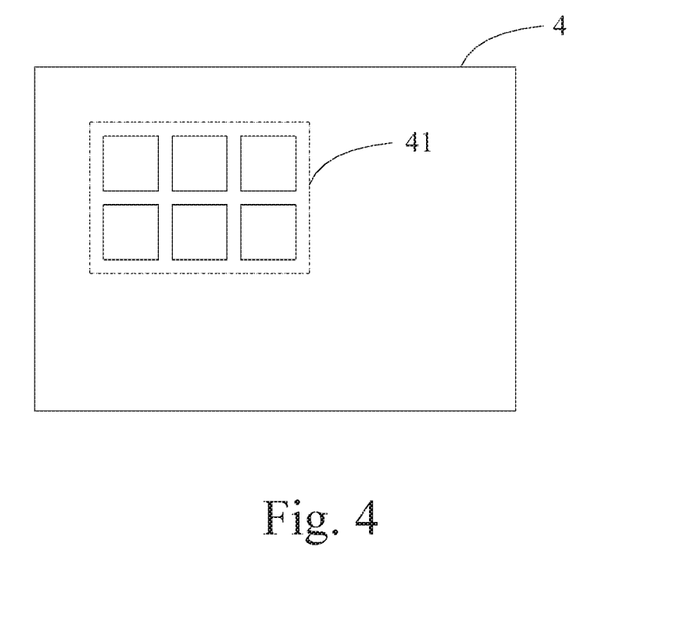
FIG. 4 is a structural illustration of an apparatus with a storage function in accordance with an embodiment in the present disclosure.

Referring to FIG. 4, FIG. 4 is a structural illustration of an apparatus with a storage function in accordance with an embodiment in the present disclosure.

In this embodiment, the apparatus 4 with the storage function may include program data 41. The program data 41 may be executed to implement the method for adjusting antenna parameter as described in the above-mentioned embodiments, therefore no additional description is given herein.

In the several embodiments provided by the present disclosure, it should be understood that the disclosed system, device, and method may be implemented in other ways. For example, the above-mentioned device implementation may be only schematic. For example, the division of the module or unit may be only a logical function division. In actual implementation, there may be additional divisions. For example, a plurality of units or assemblies may be combined or integrated into another system, or some features may be ignored or not implemented. In addition, the displayed or discussed mutual coupling or direct coupling or communication connection may be indirect coupling or communication connection through some interfaces, devices or units, and may be in electrical, mechanical, or other forms.

The units described as separate assemblies may or may not be physically separated, and the assemblies displayed as units may or may not be physical units, that is, they may be located in one place or may be distributed on a plurality of network units. A part or all of the units may be selected according to actual needs to achieve the purpose of this embodiment.

In addition, each functional unit in each embodiment of the present disclosure may be integrated into one processing unit, or each unit may exist alone physically, or two or more units may be integrated into one unit. The above-mentioned integrated unit may be implemented in the form of hardware or software function unit.

When the integrated unit is implemented in the form of a software functional unit and sold or used as an independent product, it may be stored in a computer-readable storage medium. Based on this understanding, the present disclosure essentially may be embodied in the form of a software product. The computer software product may be stored in a storage medium and include several instructions to make a computer device (which may be a personal computer, a server, or a network device, and so on) or a processor to perform all or part of the steps of the methods described in the various embodiments of the present disclosure. The above-mentioned storage media may include: an USB flash drive, a mobile hard disk, a read-only memory (ROM), a random access memory (RAM), a hard disk or an optical disk and other media that may store program codes.

It is understood that the descriptions above are only embodiments of the present disclosure. It is not intended to limit the scope of the present disclosure. Any equivalent transformation in structure and/or in scheme referring to the instruction and the accompanying drawings of the present disclosure, and direct or indirect application in other related technical field, are included within the scope of the present disclosure.

What is claimed is:

1. A method for adjusting an antenna parameter, comprising:
   acquiring a target environmental data set, wherein the target environmental data set comprises environmental data of an antenna assembly in a current location;
   after the acquiring the target environmental data set, further comprising recording the target environmental data set; acquiring the target environmental data set periodically, and comparing a currently acquired target environmental data set with the recorded target environmental data set; when the currently acquired target environmental data set is different from the recorded target environmental data set, deleting the recorded target environmental data set, and recording the currently acquired target environmental data set configured to compare with an environmental data set corresponding to a preset scene;
   comparing the currently recorded target environmental data set with the environmental data set corresponding to the preset scene;
   determining a first preset scene to which an antenna assembly corresponding to the currently recorded target environment data set belongs, to obtain a preset antenna parameter corresponding to the first preset scene, and setting a parameter of the antenna assembly for a radio signal to the preset antenna parameter, wherein the first preset scene is a preset scene to which the current location of the antenna assembly belongs.

2. The method as claimed in claim 1, further comprising:
   setting a plurality of the preset scenes in advance, wherein each of the plurality of the preset scenes corresponds to one environmental data set configured to describe its environmental information, and each of the plurality of the preset scenes corresponds to one preset antenna parameter.

3. The method as claimed in claim 2, after the determining the first preset scene to which the antenna assembly corresponding to the currently recorded target environment data set belongs, further comprising:
   recording the first preset scene;
   comparing the target environmental data set with the environmental data set corresponding to each of the plurality of the preset scenes;
   determining a second preset scene to which the antenna assembly belongs, and comparing the second preset scene with the recorded first preset scene;
   wherein when the second preset scene is different from the first preset scene, deleting the recorded first preset scene, and recording the second preset scene configured to adjust the parameter of the antenna assembly for the radio signal.

4. The method as claimed in claim 2, wherein
   the target environment data set comprises at least one of temperature data, humidity data, space size data, oxygen content data, and rainfall data, in the current location of the antenna assembly;
   the environment data set corresponding to each of the plurality of the preset scenes configured to describe the environment information corresponds to a type of environment data included in the target environment data set.

5. The method as claimed in claim 1, wherein
   the antenna assembly is an antenna array composed of a plurality of antennas.

6. The method as claimed in claim 5, wherein
   the parameter of the antenna assembly for the radio signal comprises effective isotropic radiated power (EIRP), an antenna array integration form, and a beam forming algorithm; and
   a type of the parameter of the antenna assembly for the radio signal corresponds to a type of a parameter included in the preset antenna parameter.

7. A radio device, comprising:
   a sensor group,
   a radio frequency device,
   an antenna assembly, and
   a processor;
   wherein the sensor group and the radio frequency device are respectively coupled to the processor, and the antenna assembly is coupled to the radio frequency device;

wherein the processor is configured to control the sensor group to acquire a target environmental data set, wherein the target environmental data set comprises environmental data of the antenna assembly in a current location;

after the processor is configured to acquire the target environment data set, the processor is further configured to record the target environmental data set; the processor is configured to acquire the target environmental data set periodically, and the processor is configured to compare a currently acquired target environmental data set with the recorded target environmental data set; wherein when the currently acquired target environmental data set is different from the recorded target environmental data set, the processor is configured to delete the recorded target environmental data set, and the processor is configured to record the currently acquired target environmental data set configured to compare with an environmental data set corresponding to a preset scene;

wherein when the currently acquired target environmental data set is same with the recorded target environmental data set, the processor is configured to keep the recorded first preset scene;

the processor is configured to compare the currently recorded target environmental data set with the environmental data set corresponding to the preset scene; the processor is configured to determine a first preset scene to which an antenna assembly corresponding to the currently recorded target environment data set belongs; and the processor is configured to feed back information of the first preset scene to the radio frequency device;

wherein the radio frequency device is configured to receive the information of the first preset scene; obtain a preset antenna parameter corresponding to the first preset scene, and set a parameter of the antenna assembly for a radio signal to the preset antenna parameter;

wherein the first preset scene is a preset scene to which the current location of the antenna assembly belongs.

8. The radio device as claimed in claim 7, wherein a plurality of the preset scenes are set in advance, each of the plurality of the preset scenes corresponds to one environmental data set configured to describe its environmental information, and each of the plurality of the preset scenes corresponds to one preset antenna parameter.

9. The radio device as claimed in claim 8, wherein after the processor is configured to determine the first preset scene to which the antenna assembly corresponding to the currently recorded target environment data set belongs, the processor is further configured to record the first preset scene;

the processor is configured to compare the target environmental data set with the environmental data set corresponding to each of the plurality of the preset scenes; the processor is configured to determine a second preset scene to which the antenna assembly belongs, and the processor is configured to compare the second preset scene with the recorded first preset scene;

wherein when the second preset scene is different from the first preset scene, the processor is configured to delete the recorded first preset scene, and the processor is configured to record the second preset scene configured to adjust the parameter of the antenna assembly for the radio signal; and wherein when the second preset scene is same with the first preset scene, the processor is configured to record the target environmental data set.

10. The radio device as claimed in claim 8, wherein the target environment data set comprises at least one of temperature data, humidity data, space size data, oxygen content data, and rainfall data, in the current location of the antenna assembly;

the environment data set corresponding to each of the plurality of the preset scenes configured to describe the environment information corresponds to a type of environment data included in the target environment data set.

11. The radio device as claimed in claim 7, wherein the antenna assembly is an antenna array composed of a plurality of antennas.

12. The radio device as claimed in claim 11, wherein the parameter of the antenna assembly for the radio signal comprises effective isotropic radiated power (EIRP), an antenna array integration form, and a beam forming algorithm; and a type of the parameter of the antenna assembly for the radio signal corresponds to a type of a parameter included in the preset antenna parameter.

13. The radio device as claimed in claim 7, wherein the sensor group comprises at least one of sensors; and the sensor group is configured to detect at least one of temperature data, humidity data, space size data, oxygen content data, and rainfall data, in the current location of the antenna assembly; and the radio signal radiated by the antenna assembly is a millimeter wave.

14. An apparatus with a storage function, comprising program data; wherein the program data is configured to execute operations comprising:

acquiring a target environmental data set, wherein the target environmental data set comprises environmental data of an antenna assembly in a current location;

comparing the target environmental data set with an environmental data set corresponding to a preset scene;

determining a first preset scene to which an antenna assembly corresponding to the target environment data set belongs, to obtain a preset antenna parameter corresponding to the first preset scene, and setting a parameter of the antenna assembly for a radio signal to the preset antenna parameter, wherein the first preset scene is a preset scene to which the current location of the antenna assembly belongs;

the operations further comprising setting a plurality of the preset scenes in advance, wherein each of the plurality of the preset scenes corresponds to one environmental data set configured to describe its environmental information, and each of the plurality of the preset scenes corresponds to one preset antenna parameter;

after the determining the first preset scene to which the antenna assembly corresponding to the target environment data set belongs, the operations further comprising recording the first preset scene; acquiring the target environmental data set periodically; comparing the currently acquired target environmental data set with the environmental data set corresponding to each of the plurality of the preset scenes; determining a second preset scene to which the antenna assembly belongs, and comparing the second preset scene with the recorded first preset scene; wherein when the second preset scene is different from the first preset scene, deleting the recorded first preset scene, and recording the second preset scene configured to adjust the parameter of the antenna assembly for the radio signal.

15. The apparatus as claimed in claim 14, wherein
the target environment data set comprises at least one of temperature data, humidity data, space size data, oxygen content data, and rainfall data, in the current location of the antenna assembly;

the environment data set corresponding to each of the plurality of the preset scenes configured to describe the environment information corresponds to a type of environment data included in the target environment data set.

16. The apparatus as claimed in claim 14, wherein after the acquiring the target environmental data set, the operations further comprise:

recording the target environmental data set;

comparing the currently acquired target environmental data set with the recorded target environmental data set;

wherein when the currently acquired target environmental data set is different from the recorded target environmental data set, deleting the recorded target environmental data set, and recording the currently acquired target environmental data set configured to compare with the environmental data set corresponding to the preset scene.

* * * * *